US009526158B1

(12) United States Patent
Bezel et al.

(10) Patent No.: US 9,526,158 B1
(45) Date of Patent: Dec. 20, 2016

(54) LASER-SUSTAINED PLASMA LIGHT SOURCE

(71) Applicant: KLA-Tencor Corporation, Milpitas, CA (US)

(72) Inventors: Ilya Bezel, Mountain View, CA (US); Anatoly Shchemelinin, Bozeman, MT (US); Yanming Zhao, Milpitas, CA (US); Gildardo R. Delgado, Livermore, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 14/814,622

(22) Filed: Jul. 31, 2015

Related U.S. Application Data

(63) Continuation of application No. 12/787,827, filed on May 26, 2010, now Pat. No. 9,099,292.

(60) Provisional application No. 61/182,097, filed on May 28, 2009.

(51) Int. Cl.

| | |
|---|---|
| ***H02J 1/02*** | (2006.01) |
| ***H05H 1/24*** | (2006.01) |
| ***H01J 61/09*** | (2006.01) |
| ***H01J 1/02*** | (2006.01) |
| ***H01J 23/033*** | (2006.01) |

(52) U.S. Cl.
CPC ................ *H05H 1/24* (2013.01); *H01J 1/025* (2013.01); *H01J 23/033* (2013.01); *H01J 61/09* (2013.01)

(58) Field of Classification Search
CPC ........... H01J 61/28; H01J 61/52; H01J 61/54; H01J 61/02; H01J 61/09; H01J 19/36; H01J 23/033; H01J 1/025; H05H 1/24; H05G 2/008; H05G 2/001
See application file for complete search history.

(56) References Cited

U.S. PATENT DOCUMENTS

| | | | | |
|---|---|---|---|---|
| 7,705,331 | B1 | 4/2010 | Kirk et al. | |
| 9,185,788 | B2 * | 11/2015 | Bezel | H01J 65/04 |
| 9,263,238 | B2 * | 2/2016 | Wilson | H01J 37/32339 |
| 2003/0031017 | A1 * | 2/2003 | Tsuji | G03F 7/70075 362/268 |
| 2004/0075396 | A1 * | 4/2004 | Okumura | H01J 37/32082 315/169.3 |
| 2007/0228288 | A1 | 10/2007 | Smith | |
| 2007/0228300 | A1 | 10/2007 | Smith | |
| 2009/0032740 | A1 * | 2/2009 | Smith | B82Y 10/00 250/503.1 |
| 2015/0034838 | A1 * | 2/2015 | Bezel | H01J 65/04 250/432 R |

* cited by examiner

*Primary Examiner* — Anne Hines
*Assistant Examiner* — Jose M Diaz
(74) *Attorney, Agent, or Firm* — Luedeka Neely Group, P.C.; Rick Barnes

(57) ABSTRACT

A laser sustained plasma light source having a cell with a gas volume contained within the cell. At least one laser is directed into the gas volume, for sustaining a plasma within the gas volume, which plasma produces a light. Means are provided for continuously providing the gas volume to the plasma in a laminar flow. A reflector collects the light and provides the light to a desired location.

20 Claims, 1 Drawing Sheet

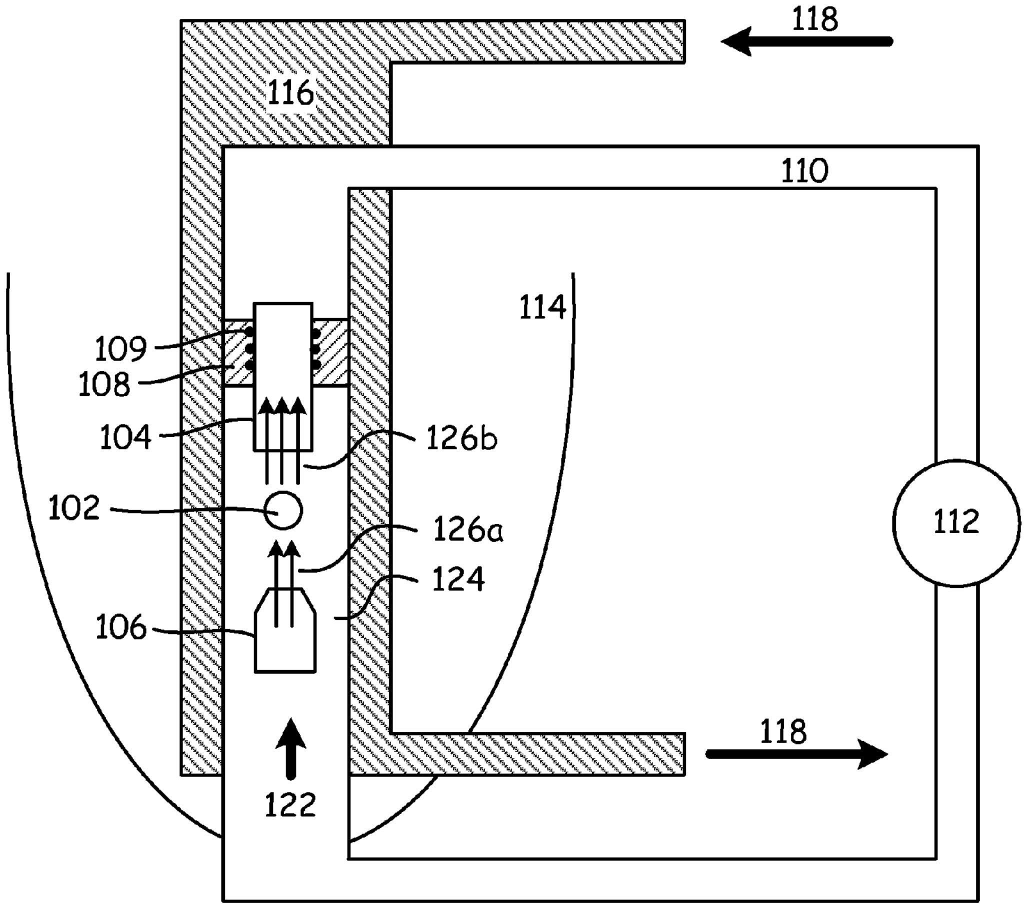
100

LASER-SUSTAINED PLASMA LIGHT SOURCE

This application is a continuation of and claims all rights and priority to U.S. patent application Ser. No. 12/787,827 filed 2010 May 26, which was a non-provisional application claiming benefits on provisional patent application Ser. No. 61/182,097 filed 2009 May 28. This invention relates to the field of integrated circuit fabrication. More particularly, this invention relates to laser-sustained plasma light sources, such as are used in various process steps during integrated circuit fabrication.

FIELD

Introduction

The desire for integrated circuits having ever-higher transistor densities tends to drive a need in the industry to reduce the size of the structures from which those integrated circuits are created. Inspection of the patterned and unpatterned substrates on which such integrated circuits are fabricated requires unprecedentedly bright broad band light sources in the ultraviolet and visible region in order to provide the sensitivity and throughput that is required by the industry. Thus, there is a continual search for light sources that produce brighter lights at shorter wavelengths.

One source of light having the desired properties is laser-sustained plasma. Tools that have laser-sustained plasma light sources operate by coupling the output power of one or more pump lasers to a given gas and plasma. The lasers are focused by means of conventional optics to a focal point within the gas volume. A plasma is ignited within the gas volume. The light emitted by the plasma is collected and provided to the tool for the desired use.

Construction of the plasma cell typically includes glass walls located about two centimeters from the plasma region and other structures that may be in even closer proximity to the plasma. For example, electrodes, which may be used to ignite the plasma, can be located about five millimeters away from the plasma. Structures that are disposed in close proximity to the plasma are generally referred to as “electrodes” herein, regardless of whether they are used to ignite the plasma.

Laser sustained plasma is characterized by a small high-temperature plasma core, typically less than about one millimeter in diameter. The gas that is heated in the plasma core exits the plasma region as a plume of hot gas, typically up to about eight thousand Kelvin, that dissipates the heat and interacts with the electrodes and cell walls, causing them to heat up to temperatures in excess of a few hundred Centigrade. The typical temperature of the glass walls in a laser sustained plasma bulb is about six hundred Centigrade, and of the top electrode about one thousand Centigrade.

Many different factors tend to influence the size, shape, brightness, and spectrum of the plasma. Such plasmas show significant instability when operating in high pressure gases, such as xenon. Instabilities come about in part due to the turbulent or unstable flow of gas through and around the plasma. The turbulent or unstable flow of gas with different temperatures distorts the plasma, as well as affects the focusing properties of the infrared lasers that sustain the plasma.

What is needed, therefore, is a system that tends to reduce problems such as those described above, at least in part.

SUMMARY OF THE CLAIMS

The above and other needs are met by a laser sustained plasma light source having a cell formed as a continuous tube with a circular cross section, a gas volume contained within the cell, at least one laser directed into the gas volume, for sustaining a plasma within the gas volume, the plasma producing a light, where the gas volume is heated as it leaves the plasma, cools as it circulates around the continuous tube of the cell, and reenters the plasma cooler than when it left the plasma and in a stable laminar flow, and a reflector for collecting the light and providing the light to a desired location.

In various embodiments according to this aspect of the invention, the gas volume circulates through the continuous tube of the cell via passive convection. In alternate embodiments the gas volume circulates through the continuous tube of the cell via active pumping. In some embodiments a cooling jacket is disposed around the cell, for further cooling of the gas volume and cell walls. In some embodiments a hollow upper electrode is disposed within the cell to receive the heated gas volume leaving the plasma, whereby the hollow upper electrode thermally shields the cell from the heated gas volume and maintains a laminar flow of the heated gas volume leaving the plasma. In some embodiments a dam is formed between the hollow upper electrode and the cell so as to cause all of the gas volume to flow through the hollow upper electrode. In some embodiments passive cooling means are disposed in the hollow upper electrode for cooling the heated gas volume leaving the plasma. In alternate embodiments active cooling means are disposed in the hollow upper electrode for cooling the heated gas volume leaving the plasma. In some embodiments a hollow lower electrode is disposed within the cell to provide the cooled gas volume to the plasma, whereby the hollow lower electrode maintains a laminar flow of the cooled gas volume entering the plasma.

According to another aspect of the invention there is described a method for producing a laser sustained plasma light by directing at least one laser into a gas volume, igniting a plasma in the gas volume, the plasma producing a light, removing heated portions of the gas volume from the plasma, cooling the heated portions of the gas volume, returning the cooled portions of the gas volume to the plasma in a stable laminar flow, and collecting the light with a reflector and providing the light to a desired location.

In various embodiments according to this aspect of the invention, the gas volume is removed and returned via passive convection. In alternate embodiments the gas volume is removed and returned via active pumping. In some embodiments the gas volume is cooled using a cooling jacket disposed around a cell that contains the gas volume. In some embodiments the heated portions of the gas volume are received with a hollow upper electrode, wherein the hollow upper electrode maintains a laminar flow of the heated gas volume leaving the plasma. In some embodiments the heated portions of the gas volume are cooled at least in part using passive cooling means disposed in the hollow upper electrode. In other embodiments the heated portions of the gas volume are cooled at least in part using active cooling means disposed in the hollow upper electrode. In some embodiments the cooled portions of the gas volume are returned to the plasma using a hollow lower electrode.

According to yet another aspect of the present invention, there is described a laser sustained plasma light source having a cell, a gas volume contained within the cell, at least one laser directed into the gas volume, for sustaining a plasma within the gas volume, the plasma producing a light, means for continuously providing the gas volume to the plasma in a stable laminar flow, and a reflector for collecting the light and providing the light to a desired location.

In various embodiments according to this aspect of the invention, there are also included means for continuously removing the gas volume from the plasma, or means for cooling the gas volume that is provided to the plasma in a stable laminar flow.

BRIEF DESCRIPTION OF THE DRAWINGS

Further advantages of the invention are apparent by reference to the detailed description when considered in conjunction with the FIGURE, which is not to scale so as to more clearly show the details, wherein like reference numbers indicate like elements, and which depicts a functional diagram of a light source according to an embodiment of the present invention.

DETAILED DESCRIPTION

With reference now to the FIGURE, there is depicted a laser sustained plasma light source 100. One or more lasers (not depicted for clarity in the FIGURE) are directed into a focal point in a substantially optically transparent cell 124 in which there exists a gas volume 110. A plasma 102 is ignited from the gas volume 110 at the focal point. The ignition of the plasma 102 can be accomplished either by the lasers, by the electrodes 104 and 106, or by other means. The visible and other spectrum light (such as ultraviolet light) emitted by the plasma 102 is collected by the reflector 114, which focuses the light to a collection point, where it is provided to whatever use for which it is desired. The various aspects of these elements as described below tend to both increase the amount of light produced by the light source 100, and reduce the noise (variability) of the light produced by the light source 100.

In some embodiments, the cell 124 includes just the vertical section in which the plasma 102 is depicted. This section is sealed on both ends. The heated gases in such a cell 124 tend to then circulate down to the bottom of the cell 124 along the cell walls, and rise back up through the plasma 102 as cooler gases **126*a*** representing a natural convection flow.

In other embodiments the cell 124 is formed of a continuous tube with a circular cross section, as depicted in the FIGURE. In this manner, the heated gasses **126*b* leave the plasma 102 via convection pumping, circulate through the return section of the cell 124, and then come back up through the plasma 102 as cooler gases 126*a*. Such a configuration provides for even more cooling of the gas volume 110 and unidirectional flow through the cell 124. This reduces optical aberrations by removing the gas regions of various temperatures from the optical path of the pump laser and collection system 114**.

In yet another embodiment, the gas volume 110 is circulated through the continuous tube cell 124 such as by a pump 112. In this manner, the velocity of the flow 122 of the gas volume 110 can be controlled, as desired. In some embodiments, higher flow rates may result in non-laminar flow of the gas through the cell 124 or through plasma region 102.

In some embodiments, the gas volume 110 flows through one or both of a hollow lower electrode 106 and a hollow upper electrode 104. One or both of these electrodes 104 and 106 can be used to ignite the plasma 102 in some embodiments. The hollow nature of these electrodes 104 and 106 allows gases 126 to flow through the electrodes 104 and 106, instead of around the electrodes 104 and 106.

In some embodiments the upper electrode 104 is surrounded by a dam 108 that forces the hot gases **126*b* through the hollow upper electrode 104, instead of allowing the hot gases 126*b* to flow around the hollow upper electrode 104. In some embodiments, the upper electrode 104 is cooled in some manner, such as by cooling tubes 109 in which a cooling media is circulated, which constitutes an active cooling means. This tends to cool the heated gases 126*b* that flow through the upper electrode 104, and also acts to keep the walls of the cell 124 cooler in the vicinity of the upper electrode 104. In some embodiments the upper electrode 104 has a shape that enhances heat transfer from the hot gases 126*b* to the upper electrode 104**, such as baffles, fins, chevrons, and so forth, which constitute passive cooling means.

In some embodiments an exterior cooling means is provided around the cell 124, such as a cooling collar 116, in which a cooling medium 118 is circulated. In some embodiments the reflector 114 has a shape that is complimentary with the shape of the cell 124 and the cooling collar 116, so as to compensate for optical aberrations caused by the cell 124 or the cooling collar 116, maximize the amount of radiation that is collected from the plasma 102, and to reduce the amount of noise in the collected radiation.

The different aspects of the various embodiments as described above tend to produce a stable laminar flow **126*a* and 126*b* of the gas volume 110 in the region of the plasma 102. This stable laminar flow 126 tends to reduce the noise in the light that is produced by the plasma 102. Further, the flow 126*a* is cooler than the flow 126*b*. The cooled gas 126*a* enables more of the laser light to reach the plasma 102 (which laser light is typically directed from below the region of the plasma 102) instead of being absorbed by the hotter gases 126*b*. When the laser energy is absorbed by the heated gases surrounding the plasma 102, then the plasma 102 tends to grow larger but not necessarily hotter since the laser power does not penetrate to the center of the plasma 102. When the laser energy is absorbed by the plasma 102, then the plasma tends to burn hotter, which is more desirable than a larger plasma 102. Circulating cooler gases 126*a* into the plasma 102 tends to produce this smaller and hotter plasma 102**. The various other cooling features described above also tend to enhance this aspect of the invention.

Using one or both of the hollow core electrodes 104 and 106 has two effects. First, the hollow core tends to enhance the laminar flow of the gases 126, which reduces noise in the light output. Second, the hollow core electrode 104 keeps the hot gases **126*b* away from the wall of the cell 124, thus reducing heating of the cell wall 124, and again reducing noise in the light output. Those elements as described above that tend to keep the wall of the cell 124 at a lower temperature, and at a uniform temperature, tend to decrease the noise in the light source 100. Those elements as described above that tend to deliver a cooled flow of gas to the plasma 102, tend to increase the brightness of the light source 100 by increasing the amount of laser energy that reaches the plasma 102. Those elements as described above that tend to produce a laminar flow 126 of the gas volume around the plasma 102, tend to decrease the noise in the light source 100 by helping to maintain a uniform and well-controlled shape for the plasma 102**.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A laser sustained plasma light source, comprising:

a cell, a gas volume contained within the cell, at least one laser directed into the gas volume, for sustaining a plasma within the gas volume, the plasma producing a light, means for continuously providing the gas volume to the plasma in a laminar flow, and a reflector for collecting the light and providing the light to a desired location.

2. The laser sustained plasma light source of claim 1, further comprising means for continuously removing the gas volume from the plasma in a unidirectional flow.

3. The laser sustained plasma light source of claim 1, further comprising means for cooling the gas volume that is provided to the plasma in the stable laminar flow.

4. The laser sustained plasma light source of claim 1, further comprising a cooling jacket disposed around the cell, for further cooling walls of the cell and the gas volume.

5. The laser sustained plasma light source of claim 1, further comprising a hollow upper electrode disposed within the cell to receive a heated gas volume leaving the plasma, whereby the hollow upper electrode thermally shields the cell from the heated gas volume and maintains a unidirectional flow of the heated gas volume leaving the plasma.

6. The laser sustained plasma light source of claim 5, further comprising a dam formed between the hollow upper electrode and the cell so as to cause all of the gas volume to flow through the hollow upper electrode.

7. The laser sustained plasma light source of claim 5, further comprising passive cooling means disposed in the hollow upper electrode for cooling the heated gas volume leaving the plasma.

8. The laser sustained plasma light source of claim 5, further comprising active cooling means disposed in the hollow upper electrode for cooling the heated gas volume leaving the plasma.

9. The laser sustained plasma light source of claim 1, further comprising a hollow lower electrode disposed within the cell to provide a cooled gas volume to the plasma, whereby the hollow lower electrode maintains a laminar flow of the cooled gas volume entering the plasma.

10. A laser sustained plasma light source, comprising:

a cell, a gas volume contained within the cell, at least one laser directed into the gas volume, for sustaining a plasma within the gas volume, the plasma producing a light, means for continuously removing the gas volume from the plasma in a unidirectional flow, means for continuously providing the gas volume to the plasma in a laminar flow, means for cooling the gas volume that is provided to the plasma in the laminar flow and a reflector for collecting the light and providing the light to a desired location.

11. The laser sustained plasma light source of claim 10, further comprising a cooling jacket disposed around the cell, for further cooling walls of the cell and the gas volume.

12. The laser sustained plasma light source of claim 10, further comprising a hollow upper electrode disposed within the cell to receive a heated gas volume leaving the plasma, whereby the hollow upper electrode thermally shields the cell from the heated gas volume and maintains a unidirectional flow of the heated gas volume leaving the plasma.

13. The laser sustained plasma light source of claim 12, further comprising a dam formed between the hollow upper electrode and the cell so as to cause all of the gas volume to flow through the hollow upper electrode.

14. The laser sustained plasma light source of claim 12, further comprising passive cooling means disposed in the hollow upper electrode for cooling the heated gas volume leaving the plasma.

15. The laser sustained plasma light source of claim 12, further comprising active cooling means disposed in the hollow upper electrode for cooling the heated gas volume leaving the plasma.

16. The laser sustained plasma light source of claim 10, further comprising a hollow lower electrode disposed within the cell to provide a cooled gas volume to the plasma, whereby the hollow lower electrode maintains a laminar flow of the cooled gas volume entering the plasma.

17. A laser sustained plasma light source, comprising:

a cell, a gas volume contained within the cell, at least one laser directed into the gas volume, for sustaining a plasma within the gas volume, the plasma producing a light, a hollow upper electrode disposed within the cell to receive a heated gas volume leaving the plasma, whereby the hollow upper electrode thermally shields the cell from the heated gas volume and maintains a unidirectional flow of the heated gas volume leaving the plasma, a hollow lower electrode disposed within the cell to provide a cooled gas volume to the plasma, whereby the hollow lower electrode maintains a laminar flow of the cooled gas volume entering the plasma, and a reflector for collecting the light and providing the light to a desired location.

18. The laser sustained plasma light source of claim 17, further comprising a cooling jacket disposed around the cell, for further cooling walls of the cell and the gas volume.

19. The laser sustained plasma light source of claim 17, further comprising passive cooling means disposed in the hollow upper electrode for cooling the heated gas volume leaving the plasma.

20. The laser sustained plasma light source of claim 5, further comprising active cooling means disposed in the hollow upper electrode for cooling the heated gas volume leaving the plasma.

* * * * *